(12) United States Patent
Chen

(10) Patent No.: US 12,037,993 B2
(45) Date of Patent: Jul. 16, 2024

(54) TWO-DIMENSIONAL ENGINE

(71) Applicant: Xiaohui Chen, Jinhua (CN)

(72) Inventor: Xiaohui Chen, Jinhua (CN)

(*) Notice: Subject to any disclaimer, the term of this patent is extended or adjusted under 35 U.S.C. 154(b) by 70 days.

(21) Appl. No.: 17/975,783

(22) Filed: Oct. 28, 2022

(65) Prior Publication Data

US 2023/0048404 A1 Feb. 16, 2023

Related U.S. Application Data

(63) Continuation of application No. PCT/CN2021/000019, filed on Jan. 27, 2021.

(30) Foreign Application Priority Data

Jul. 25, 2020 (CN) .......................... 202010764619

(51) Int. Cl.
*F04B 35/01* (2006.01)
*F01B 9/04* (2006.01)
(Continued)

(52) U.S. Cl.
CPC .............. *F04B 35/01* (2013.01); *F01B 9/047* (2013.01); *F02B 3/02* (2013.01); *F02B 23/10* (2013.01);
(Continued)

(58) Field of Classification Search
CPC .. F02B 23/10; F02B 3/02; F02B 33/02; F02B 33/28; F02B 37/00; F02B 43/10; F02B 61/06; F02B 67/04; F02B 69/04; F02B 71/00; F04B 39/0005; F04B 39/121; F04B 17/00; F04B 39/0094; F04B 39/10; F04B 39/12; F04B 35/01; F01B 9/047
See application file for complete search history.

(56) References Cited

U.S. PATENT DOCUMENTS 10,294,857 B2 * 5/2019 Chen ........................ F02B 33/28
2010/0294232 A1 * 11/2010 Otterstrom .............. F01B 9/047
123/197.1

(Continued)

FOREIGN PATENT DOCUMENTS

CN 105888843 A 8/2016
CN 105987013 A 10/2016
(Continued)

*Primary Examiner* — Dominick L Plakkoottam

(57) ABSTRACT

The present invention discloses a two-dimensional engine, including a driving device, a two-dimensional gas compressor, a gas outlet pipe, a refueling device, a safety device, an electric ignition device, an axial-flow gas compressor, and a crank connecting rod mechanism, wherein the electric ignition device is arranged on a left side of the gas outlet pipe; the crank connecting rod mechanism is arranged below the gas outlet pipe; the driving device includes a first motor, a first gear, a first dowel bar and a first rack that is arranged on the first dowel bar; the first rack is meshed with the first gear; and the two-dimensional gas compressor includes an upper pressure plate, a first cylindrical plate, a second cylindrical plate, a fixing rod, a first pressure-bearing plate, a second pressure-bearing plate and a shell. The present invention has the beneficial effects of simple structure and relatively high energy utilization rate.

1 Claim, 4 Drawing Sheets

(51) Int. Cl.
*F02B 3/02* (2006.01)
*F02B 23/10* (2006.01)
*F02B 33/02* (2006.01)
*F04B 39/00* (2006.01)
*F04B 39/12* (2006.01)

(52) U.S. Cl.
CPC .......... *F02B 33/02* (2013.01); *F04B 39/0005* (2013.01); *F04B 39/12* (2013.01); *F04B 39/121* (2013.01)

(56) References Cited

U.S. PATENT DOCUMENTS

| | | | |
|---|---|---|---|
| 2013/0269634 A1* | 10/2013 | Rez | F01B 9/047 |
| | | | 123/197.5 |
| 2017/0363075 A1* | 12/2017 | Chen | F04B 41/02 |
| 2018/0009304 A1* | 1/2018 | Chen | F04B 35/06 |
| 2018/0223820 A1* | 8/2018 | Ignatiev | F04B 39/10 |
| 2018/0320589 A1* | 11/2018 | Chen | F02C 7/20 |
| 2019/0032556 A1* | 1/2019 | Chen | F02M 21/0215 |

FOREIGN PATENT DOCUMENTS

| | | |
|---|---|---|
| CN | 107288746 A | 10/2017 |
| WO | 03056136 A1 | 7/2003 |

* cited by examiner

US 12,037,993 B2

TWO-DIMENSIONAL ENGINE

CROSS-REFERENCE TO RELATED APPLICATIONS

This application is a continuation of International Patent Application No. PCT/CN2021/000019, filed on Jan. 27, 2021, which claims the benefit of priority from Chinese Patent Application No. 202010764619.5, filed on Jul. 25, 2020. The content of the aforementioned application, including any intervening amendments thereto, is incorporated herein by reference in its entirety.

TECHNICAL FIELD

The present invention relates to engine manufacturing technology.

BACKGROUND

An engine is a machine that is capable of converting other forms of energy into mechanical energy, including internal combustion engines (gasoline engines, and so on), external combustion engines (Stirling engines, steam engines, and so on), electric motors, and the like. For example, the internal combustion engines usually convert chemical energy into mechanical energy. The engine is not only suitable for power generation devices, but can also refers to an entire machine that includes a power device (such as a gasoline engine and a aircraft engine).

SUMMARY

The purpose of the present invention is to provide a two-dimensional engine, so as to solve the technical problems of a too complicated structure and a low energy utilization rate in the prior art.

In order to solve the above problems, the technical solution utilized by the present invention is:

A two-dimensional engine, including a driving device, a two-dimensional gas compressor, a gas outlet pipe, a refueling device, a safety device, an electric ignition device, an axial-flow gas compressor, and a crank connecting rod mechanism, wherein the electric ignition device is arranged on a left side of the gas outlet pipe; the crank connecting rod mechanism is arranged below the gas outlet pipe; the driving device includes a first motor, a first gear, a first dowel bar and a first rack that is arranged on the first dowel bar; the first rack is meshed with the first gear; the two-dimensional gas compressor includes an upper pressure plate, a first cylindrical plate, a second cylindrical plate, a fixing rod, a first pressure-bearing plate, a second pressure-bearing plate and a shell; the bottom of the first dowel bar is fixedly connected to a partial top of the upper pressure plate; the interior of the upper pressure plate is hollow; the top of the first cylindrical plate is fixedly connected to a partial bottom of the upper pressure plate; the top of the second cylindrical plate is fixedly connected to a partial bottom of the upper pressure plate; an upper part of the shell is provided with a gas inlet; the axial-flow gas compressor is arranged on the left side of the gas inlet; a gas outlet of the axial-flow gas compressor communicates with the gas inlet; a partial bottom of the shell protrudes downward to form a first groove; a partial bottom of the shell protrudes downward to form a second groove; the first cylindrical plate may move up and down in the first groove; the second cylindrical plate may move up and down in the second groove; a partial bottom of the shell is provided with a second gas outlet; the top of the gas outlet pipe is fixedly connected to a partial bottom of the shell; the top of the fixing rod is fixedly connected to a partial bottom of the upper pressure plate; the second pressure-bearing plate is provided with a first small hole, and the fixing rod is fixedly connected to the second pressure-bearing plate after passing through the first small hole; the bottom of the fixing rod is fixedly connected to a partial top of the first pressure-bearing plate; the interior of the fixing rod is hollow; the interior of the first pressure-bearing plate is hollow; the interior of the second pressure-bearing plate is hollow; the interior of the first cylindrical plate is hollow; the interior of the second cylindrical plate is hollow; the interior of the shell is hollow; the first pressure-bearing plate and the second pressure-bearing plate may move up and down in the gas outlet pipe; the safety device includes a third motor, a third gear, a third bumper, a third rack that is arranged on the third bumper, and a fourth rack that is arranged on the first dowel bar; the gas outlet pipe is provided with a second small hole; and the refueling device is arranged in the vicinity of the second small hole.

The present invention has the beneficial effects of simple structure and relatively high energy utilization rate.

DETAILED DESCRIPTION OF EMBODIMENTS

The specific embodiments of the present invention will be further described below in combination with drawings.

Figure 1:
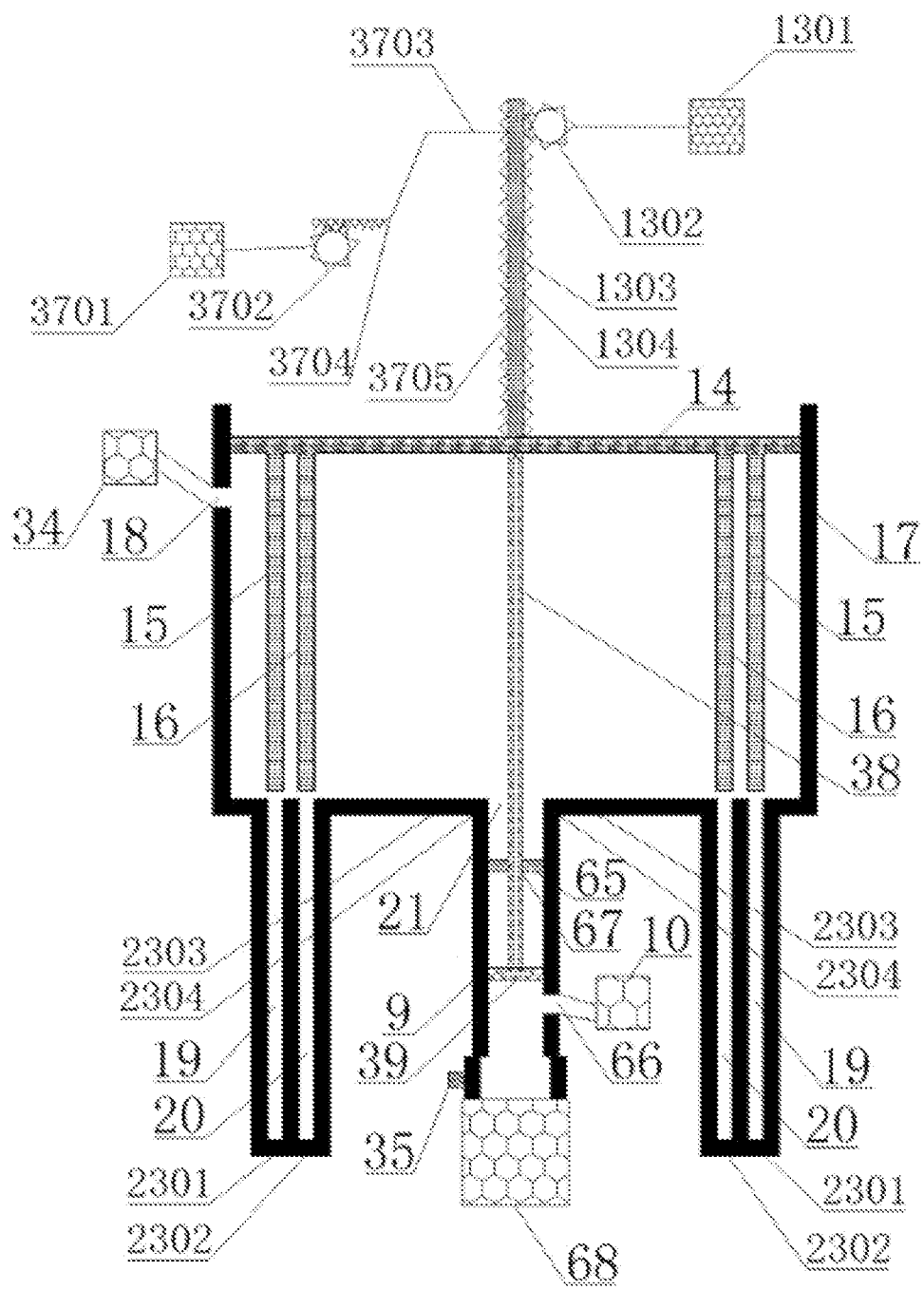
FIG. 1 is a schematic structural diagram of a two-dimensional engine.
Figure 2:
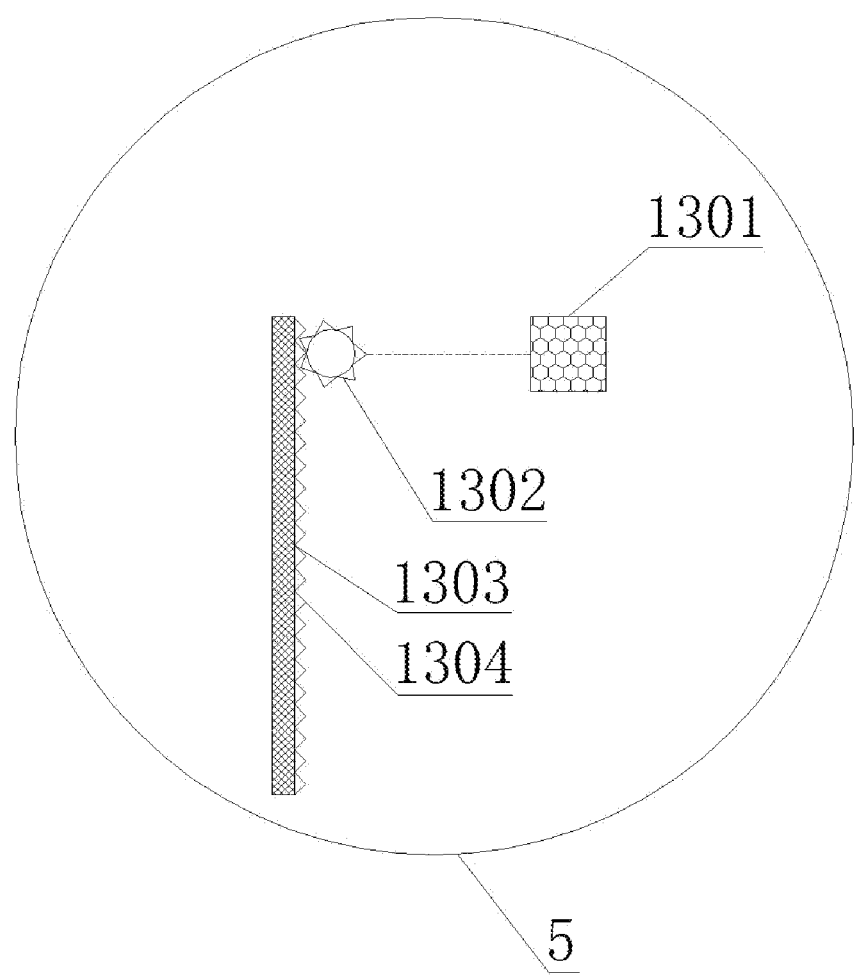
FIG. 2 is a schematic structural diagram of a driving device.
Figure 3:
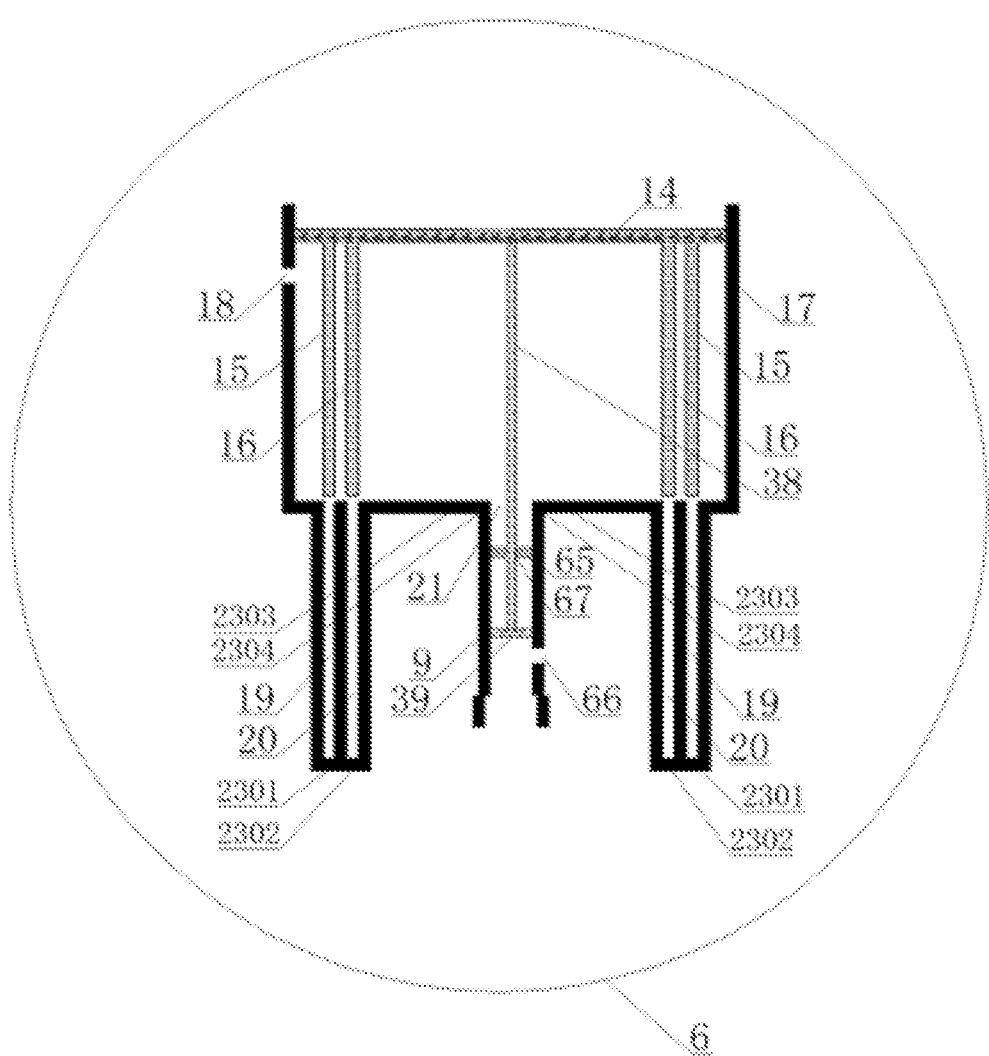
FIG. 3 is a schematic structural diagram of a two-dimensional gas compressor.
Figure 4:
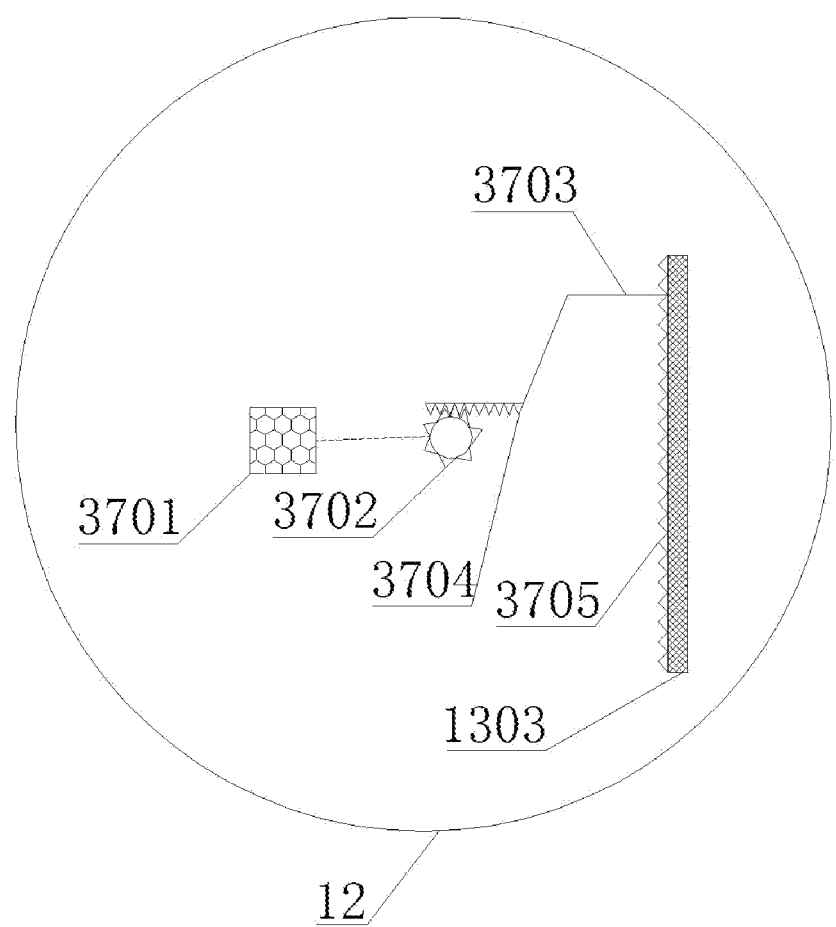
FIG. 4 is a schematic structural diagram of a safety device.

A two-dimensional engine shown in FIG. 1 is characterized by including a driving device 5, a two-dimensional gas compressor 6, a gas outlet pipe 9, a refueling device 10, a safety device 35, an electric ignition device, an axial-flow gas compressor 34, and a crank connecting rod mechanism 68, wherein the electric ignition device 35 is arranged on a left side of the gas outlet pipe 9; the crank connecting rod mechanism 68 is arranged below the gas outlet pipe 9; the driving device 5 (as shown in FIG. 2) includes a first motor 1301, a first gear 1302, a first dowel bar 1303 and a first rack 1304 that is arranged on the first dowel bar 1303; the first rack 1304 is meshed with the first gear 1302; the two-dimensional gas compressor 6 (as shown in FIG. 3) includes an upper pressure plate 14, a first cylindrical plate 15, a second cylindrical plate 16, a fixing rod 38, a first pressure-bearing plate 39, a second pressure-bearing plate 35 and a shell 17; the bottom of the first dowel bar 1303 is fixedly connected to a partial top of the upper pressure plate 14; the interior of the upper pressure plate 14 is hollow; the top of the first cylindrical plate 15 is fixedly connected to a partial bottom of the upper pressure plate 14; the top of the second cylindrical plate 16 is fixedly connected to a partial bottom of the upper pressure plate 14; an upper part of the shell 17 is provided with a gas inlet 18; the axial-flow gas compressor 34 is arranged on the left side of the gas inlet 18; a gas outlet of the axial-flow gas compressor 34 communicates with the gas inlet 18; a partial bottom 2301 of the shell 17 protrudes downward to form a first groove 19; a partial bottom 2302 of the shell 17 protrudes downward to form a second groove 20; the first cylindrical plate 15 may move up and down in the first groove 19; the second cylindrical plate 16 may move up and down in the second groove 20; a partial bottom 2303 of the shell 17 is provided with a second gas outlet 21; the top of the gas outlet pipe 9 is fixedly connected to a partial bottom 2304 of the shell 17; the top of the fixing rod 38 is fixedly connected to a partial bottom of the upper pressure plate 14; the second pressure-bearing plate 65 is provided with a first small hole 67, and the fixing rod 38 is fixedly connected to the second pressure-bearing plate 65 after passing through the first small hole 67; the bottom of the fixing rod 38 is fixedly connected to a partial top of the first pressure-bearing plate 39; the interior of the fixing rod 38 is hollow; the interior of the first pressure-bearing plate 39 is hollow; the interior of the second pressure-bearing plate 65 is hollow; the interior of the first cylindrical plate 15 is hollow; the interior of the second cylindrical plate 16 is hollow; the interior of the shell 17 is hollow; the first pressure-bearing plate 39 and the second pressure-bearing plate 65 may move up and down in the gas outlet pipe 9; the safety device 12 (as shown in FIG. 4) includes a third motor 3701, a third gear 3702, a third bumper 3070, a third rack 3704 that is arranged on the third bumper 3703, and a fourth rack 3705 that is arranged on the first dowel bar 1303; the gas outlet pipe 9 is provided with a second small hole 66; and the refueling device 10 is arranged in the vicinity of the second small hole 66.

A specific operation process of the present invention is as follows:
1. External gas enters the two-dimensional gas compressor 6 from the gas inlet 18 by means of the gas outlet of the axial-flow gas compressor 34.
2. The first motor 1301, after being started, drives the first dowel bar 1303 to move downward, and the upper pressure plate 14 also moves downward and compresses the gas in the two-dimensional gas compressor 6; and the compressed gas enters the gas outlet pipe 9.
3. The refueling device 10 adds gasoline into the gas outlet 9.
4. The electric ignition device 35 ignites the gas in the gas outlet pipe 9. The third motor 3701 is started to drive the third bumper 3703 to move rightward, and the third bumper 3703 is inserted into the middle of the rack of the fourth rack 3705, so as to prevent the first dowel bar 1303 from moving upward.
5. The gas in the gas outlet pipe 9 pushes the crank connecting rod mechanism 68 to do work.

Parts that are not specifically described in the above specification are the prior art, or can be realized by the prior art. All equivalent changes and modifications made according to the content of the patented scope of the present invention shall be regarded as the technical scope of the present invention.

What is claimed is:
1. A two-dimensional engine, comprising: a driving device (5), a two-dimensional gas compressor (6), a gas outlet pipe (9), a refueling device (10), a safety device (12), an electric ignition device (35), an axial-flow gas compressor (34), and a crank connecting rod mechanism (68), wherein the electric ignition device (35) is arranged on a left side of the gas outlet pipe (9); the crank connecting rod mechanism (68) is arranged below the gas outlet pipe (9); the driving device (5) comprises a first motor (1301), a first gear (1302), a first dowel bar (1303) and a first rack (1304) that is arranged on the first dowel bar (1303); the first rack (1304) is meshed with the first gear (1302); the two-dimensional gas compressor (6) comprises an upper pressure plate (14), a first cylindrical plate (15), a second cylindrical plate (16), a fixing rod (38), a first pressure-bearing plate (39), a second pressure-bearing plate (65) and a shell (17); the bottom of the first dowel bar (1303) is fixedly connected to a partial top of the upper pressure plate (14); the interior of the upper pressure plate (14) is hollow; the top of the first cylindrical plate (15) is fixedly connected to a partial bottom of the upper pressure plate (14); the top of the second cylindrical plate (16) is fixedly connected to a partial bottom of the upper pressure plate (14); an upper part of the shell (17) is provided with a gas inlet (18); the axial-flow gas compressor (34) is arranged on the left side of the gas inlet (18); a gas outlet of the axial-flow gas compressor (34) communicates with the gas inlet (18); a partial bottom (2301) of the shell (17) protrudes downward to form a first groove (19); a partial bottom (2302) of the shell (17) protrudes downward to form a second groove (20); the first cylindrical plate (15) may move up and down in the first groove (19); the second cylindrical plate (16) may move up and down in the second groove (20); a partial bottom (2303) of the shell (17) is provided with a second gas outlet (21); the top of the gas outlet pipe (9) is fixedly connected to a partial bottom (2304) of the shell (17); the top of the fixing rod (38) is fixedly connected to a partial bottom of the upper pressure plate (14); the second pressure-bearing plate (65) is provided with a first small hole (67), and the fixing rod (38) is fixedly connected to the second pressure-bearing plate (65) after passing through the first small hole (67); the bottom of the fixing rod (38) is fixedly connected to a partial top of the first pressure-bearing plate (39); the interior of the fixing rod (38) is hollow; the interior of the first pressure-bearing plate (39) is hollow; the interior of the second pressure-bearing plate (65) is hollow; the interior of the first cylindrical plate (15) is hollow; the interior of the second cylindrical plate (16) is hollow; the interior of the shell (17) is hollow; the first pressure-bearing plate (39) and the second pressure-bearing plate (65) may move up and down in the gas outlet pipe (9); the safety device (12) comprises a third motor (3701), a third gear (3702), a third bumper (3703), a third rack (3704) that is arranged on the third bumper (3703), and a fourth rack (3705) that is arranged on the first dowel bar (1303); the gas outlet pipe (9) is provided with a second small hole (66); and the refueling device (10) is arranged in the vicinity of the second small hole (66).

* * * * *